(12) United States Patent
Reed

(10) Patent No.: US 9,188,122 B1
(45) Date of Patent: Nov. 17, 2015

(54) VALVE AND SEAT ASSEMBLY FOR HIGH PRESSURE PUMPS AND METHOD OF USE

(76) Inventor: Glen E. Reed, Houston, TX (US)

( * ) Notice: Subject to any disclaimer, the term of this patent is extended or adjusted under 35 U.S.C. 154(b) by 723 days.

(21) Appl. No.: 13/463,376

(22) Filed: May 3, 2012

Related U.S. Application Data

(60) Provisional application No. 61/499,821, filed on Jun. 22, 2011.

(51) Int. Cl.
*F04B 53/10* (2006.01)
*F16K 15/06* (2006.01)

(52) U.S. Cl.
CPC ............ *F04B 53/109* (2013.01); *F04B 53/1022* (2013.01); *F16K 15/066* (2013.01)

(58) Field of Classification Search
CPC ............ F16K 15/066; Y02T 137/7838; Y02T 137/7939; Y02T 137/7839; F04B 53/109; F04B 53/1092; F04B 53/164; F04B 53/1022
USPC .................................. 137/512, 512.1; 417/567
See application file for complete search history.

(56) References Cited

U.S. PATENT DOCUMENTS

| | | | | |
|---|---|---|---|---|
| 3,811,801 A | * | 5/1974 | Buse et al. | 417/454 |
| 4,551,077 A | * | 11/1985 | Pacht | 417/454 |
| 4,878,815 A | * | 11/1989 | Stachowiak | 417/63 |
| 5,230,363 A | * | 7/1993 | Winn et al. | 137/512.3 |
| 5,302,087 A | * | 4/1994 | Pacht | 417/53 |
| 5,605,449 A | | 2/1997 | Reed | |
| 5,924,853 A | * | 7/1999 | Pacht | 417/567 |
| 2004/0178285 A1 | * | 9/2004 | Forrest | 239/381 |
| 2010/0140526 A1 | * | 6/2010 | Forrest et al. | 251/359 |

* cited by examiner

*Primary Examiner* — Craig Schneider
*Assistant Examiner* — Frederick D Soski
(74) *Attorney, Agent, or Firm* — Buskop Law Group, PC; Wendy Buskop

(57) ABSTRACT

An assembly and method for engaging fluid pumps can include a seat assembly having a body with a central bore, a suction face, a discharge face, fluid openings in the body, a tapered portion with fluid exits, and valve seats. The assembly can include a suction valve with a guide and valve bore engaged within the central bore, a tapered surface, an outer spring stop, and a spring guide. When the assembly is in a closed position the tapered surface can be engaged with the valve seats, allowing fluid to flow through the valve bore and the central bore. When the assembly is in an opened position the fluid openings can receive and flow the fluid in a laminar flow to the fluid exits to push the suction valve away from the suction face and create a venturi effect with the fluid.

16 Claims, 6 Drawing Sheets

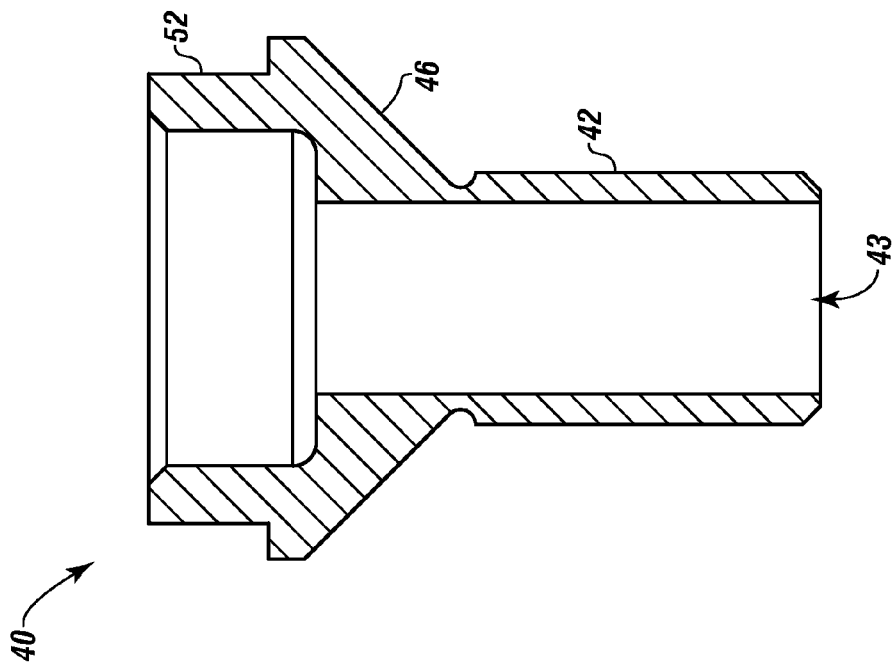
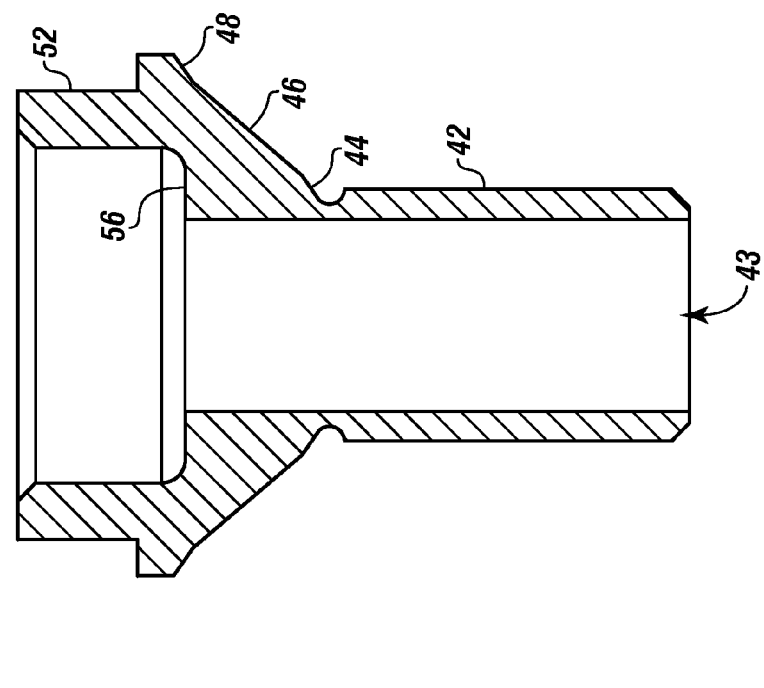

VALVE AND SEAT ASSEMBLY FOR HIGH PRESSURE PUMPS AND METHOD OF USE

CROSS REFERENCE TO RELATED APPLICATIONS

The present application claims priority to and the benefit of U.S. Provisional Patent Application Ser. No. 61/499,821 filed on Jun. 22, 2011, entitled "VALVE AND SEAT ASSEMBLY FOR HIGH PRESSURE WATER PUMPS." This reference is incorporated in its entirety herein.

FIELD

The present embodiments generally relate to a suction valve and seat assembly for use with high pressure pumps and a method for performing hydrostatic testing and cleaning of reaction vessels, ship hulls, bridges, and other high pressure cleaning applications.

BACKGROUND

A need exists for a suction valve and seat assembly that forms a venturi effect to flow higher volumes of fluid.

A need exists for a suction valve and seat assembly that has a long functional life.

A need exists for a suction valve and seat assembly and method for installing and using the suction valve and seat assembly with high pressure pumps without requiring the use of torque wrenches and other costly installation equipment.

A need exists for a suction valve and seat assembly that can be installed on high pressure pumps more quickly than other valve and seat assemblies.

A need exists for a quick and easy method for pumping at high pressures.

A need exists for a suction valve and seat assembly that has a combination of an elastomeric O-ring and a polyether ether ketone seal, allowing for a longer functional life of associated pumps, and allowing the suction valve and seat assembly to be operated at higher pressures.

A need exists for a suction valve and seat assembly that can operate with pumps having a wide range of horsepower (HP), allowing a single suction valve and seat assembly to be used with multiple pumps.

A need exists for a method for pumping that can accommodate a variety of HP pumps and can be used on different size pumps.

The present embodiments meet these needs.

BRIEF DESCRIPTION OF THE DRAWINGS

The detailed description will be better understood in conjunction with the accompanying drawings as follows:

FIGS. 4A and 4B depict cut side views of a suction valve.

Figure 1:
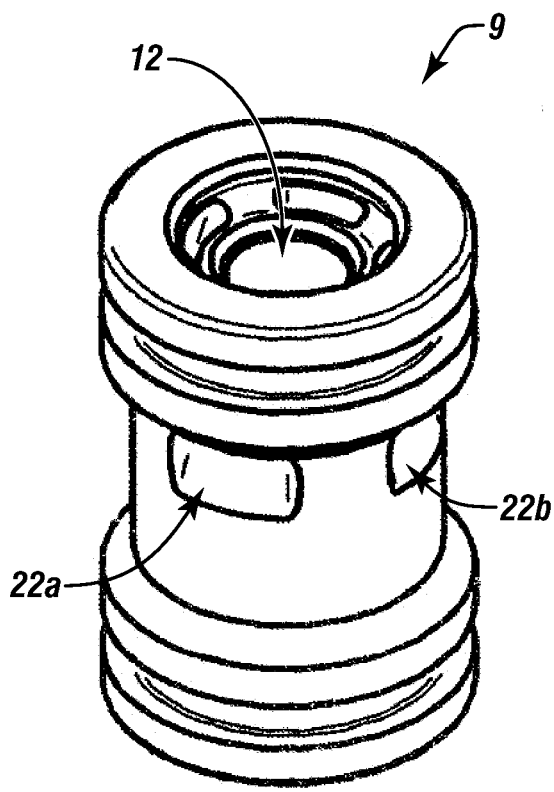
FIG. 1 depicts a perspective view of a seat assembly.

The present embodiments are detailed below with reference to the listed Figures.

DETAILED DESCRIPTION OF THE EMBODIMENTS

Before explaining the present apparatus and method in detail, it is to be understood that the apparatus and method are not limited to the particular embodiments and that the embodiments can be practiced or carried out in various ways.

One or more of the present embodiments relate to a suction valve and seat assembly that can create a venturi effect in fluid, allowing high pressure fluid pumps to flow higher volumes of fluid without requiring additional force.

One or more of the present embodiments relate to a method for pumping that uses the venturi effect and allows high pressure fluid pumps to flow higher volumes of fluid without requiring additional force, use of electricity, or larger motors.

The venturi effect can minimize cavitation and pulsation of an associated high pressure fluid pump; thereby saving energy by not requiring as much force to pump the fluid.

The suction valve and seat assembly and method can produce a high pressure laminar flow of fluid, such as water or another fluid.

The laminar flow and venturi effect can allow the fluid to easily flow through a body of the suction valve and seat assembly without being circuitous. In one or more embodiments, the suction valve and seat assembly can provide an increase in overall fluid flow efficiency by at least 80 percent.

The suction valve and seat assembly and method can allow pumping of the fluid via high pressure fluid pumps to be completed in a shorter amount of time, such as in 50 percent less time than known reciprocating pumps.

The suction valve and seat assembly and method can be used with high pressure fluid pumps, such as water pumps configured to pump water at a pressure ranging from about 5 pounds per square inch (psi) to about 150 psi.

The suction valve and seat assembly can engage a fluid side of the high pressure fluid pump.

The suction valve and seat assembly can be used with high pressure fluid pumps for hydrostatic testing, cutting, blasting, demolition, and cleaning. For example, the high pressure fluid pumps with the suction valve and seat assembly can be used to clean sticky materials inside of reaction vessels at chemical plants. The high pressure fluid pumps with the suction valve and seat assembly can be used to remove barnacles and other substances from portions of tankers, container ships, drilling platforms, or the like.

The suction valve and seat assembly can have a small number of moving parts compared to known reciprocating pumps. For example, the suction valve and seat assembly can have elliptical shaped individual fluid exits and conduits to flow fluid to move between a closed position and opened position. As such, the suction valve and seat assembly can produce an increased functional life span of associated high pressure fluid pumps without requiring constant repair of the high pressure fluid pumps.

The suction valve and seat assembly can be modular, allowing for the replacement of one portion of the suction valve and seat assembly, such as the suction valve, without requiring the replacement of other portions of the suction valve and seat assembly. For example, the seat assembly can be replaced in the field without replacing the entire suction valve and seat assembly or the associated high pressure fluid pump. As such, the suction valve and seat assembly can be more cost effective to maintain than known reciprocating pumps.

The suction valve and seat assembly can provide an increase in overall fluid flow efficiency. For example, the suction valve and seat assembly can have fewer holes and larger openings than known apparatus.

The seat assembly can have a body with an outer surface and a central bore disposed through the body. The central bore can extend along a longitudinal axis of the body. The central bore can have a diameter ranging from about 0.25 inches to about 2 inches. The seat assembly can have a length ranging from about 1 inch to about 4 inches. The seat assembly can have other dimensions depending upon the particular application.

The body can have a tapered portion proximate the central bore, which can be in fluid communication with the central bore. In one or more embodiments, the tapered portion can have a slope ranging from about 30 degrees to about 50 degrees from the longitudinal axis of the body.

The body can have a suction face at one end of the body proximate a first end of the central bore. The tapered portion of the body can be disposed between the suction face and the central bore.

The body can have a discharge face at another end of the body, opposite the suction face. The discharge face can be disposed proximate a second end of the central bore opposite the first end of the central bore.

The suction face can have a suction face diameter, which can be larger than the outer body diameter, but equal to a discharge face diameter. In one or more embodiments, the diameter of the suction face and the discharge face can range from about 0.75 inches to about 3.25 inches.

One or more fluid openings can be disposed through or formed in the outer surface of the body. The fluid openings can be tapered and/or square shaped. In one or more embodiments, the tapered fluid openings can have a slope ranging from about 15 degrees to about 25 degrees from the longitudinal axis of the body.

In one or more embodiments, the fluid openings can have a length ranging from about 0.2 inches to about 1 inch, and a width ranging from about 0.2 inches to about 0.538 inches. The length of the fluid openings can be less than the width of the fluid openings.

One or more fluid exits can be disposed through or formed in the tapered portion of the body proximate the suction face. Each of the fluid exits can be in fluid communication with at least one of the fluid openings. One or more embodiments can include from about two fluid exits to about six fluid exits, and from about two fluid openings to about six fluid openings.

The fluid exits can be elliptical or circular in shape. In one or more embodiments, each fluid exit can have a width ranging from about 0.025 inches to about 2 inches, and a length ranging from about 0.2 inches to about 1 inch.

In operation, the fluid openings can allow fluid, such as water, to flow into the body and out of the fluid exits proximate the suction face. In one or more embodiments, the fluid can be water, diesel fuel, methanol, ethanol, glycol, or hydraulic fluid.

The body can include a chamfer, which can be disposed adjacent the central bore proximate the suction face. The chamfer can be disposed between the central bore and the tapered portion of the body.

The body can have an outer tapered valve seat disposed between the suction face and the tapered portion. The outer tapered valve seat can have a first diameter.

The body can have an inner tapered valve seat disposed between the tapered portion and the chamfer. The inner tapered valve seat can have a second diameter. The first diameter can be larger than the second diameter. For example, the first diameter can be from about 10 percent to about 30 percent larger than the second diameter.

The body can have a first seal ring, which can be integral with the outer surface of the body. The first seal ring can be formed on the body such that a first seal ring groove can be formed between the first seal ring and the suction face.

The first seal ring can have a first angled shoulder, which can be formed between the first seal ring and the fluid openings.

The body can have a second seal ring, which can be integral with the outer surface of the body and spaced apart from the first seal ring.

The second seal ring can be formed on the body such that a second seal ring groove can be formed between the second seal ring and the discharge face. The second seal ring groove can be formed circumferentially around the outer surface of the body between the discharge face and the fluid openings. The second seal ring can have a second angled shoulder.

The suction valve can be engaged with the seat assembly to form the suction valve and seat assembly.

The suction valve can have a guide with a valve bore centrally disposed through the guide. The guide can engage within the central bore of the seat assembly, such as in a sliding engagement.

In one or more embodiments, the valve bore can have an inner diameter ranging from about 0.25 inches to about 2.5 inches. The inner diameter of the valve bore can be smaller than the inner diameter of the central bore, and the guide of the suction valve can engage within the central bore of the seat assembly.

The suction valve can have a first seat surface adjacent the guide.

A tapered surface can be formed adjacent the first seat surface. In one or more embodiments, the tapered surface can be tapered at a slope identical to the slope of the tapered portion, allowing the tapered surface of the suction valve to engage the tapered surface of the seat assembly in a flush configuration.

A second seat surface can be formed adjacent the tapered surface. The first seat surface and second seat surface can be configured to engage the inner tapered valve seat and the outer tapered valve seat.

The suction valve can have an outer spring stop, which can be disposed adjacent the second seat surface. The inner spring stop can have an inner spring stop diameter, which can be greater than a guide diameter of the guide. For example, the inner spring stop diameter can be from about 10 percent to about 20 percent larger than the guide diameter.

The suction valve can have a spring guide. The spring guide can extend longitudinally from the inner spring stop.

The spring guide can contain an inner coiled spring and support an outer coiled spring for providing a biased load.

In operation, when the inner spring stop can be disposed on the suction face and the valve bore can be in fluid communication with the central bore. The suction valve can have an opened position and a closed position.

In the opened position, the fluid can flow into the fluid openings in a laminar flow, and then out of the fluid exits without entering the central bore.

The fluid flowing out the fluid exists can push the suction valve away from the suction face; thereby creating the venturi effect with the fluid.

To close the suction valve, the fluid can flow through the valve bore and the central bore to cause the inner spring stop to engage the suction face. As such, the suction valve and seat assembly can operate to close the suction valve by allowing the fluid to pass through the valve bore to the central bore, rather than the fluid passing around the body and through the fluid openings.

The suction valve and seat assembly can be more efficient and require at least 10 percent less energy to close the suction valve than when the fluid flows around the body.

In one or more embodiments, the method can include engaging a fluid side of a high pressure fluid pump with the seat assembly. The seat assembly can be in fluid communication with the suction valve, which can be adapted to move between an opened position and a closed position.

When the suction valve and seat assembly is in the closed position, the first seat surface and second seat surface can be engaged with the outer tapered valve seat and inner tapered valve seat; thereby allowing the valve bore to be in fluid communication with the central bore and allowing the fluid to flow through the valve bore and central bore.

When the suction valve and seat assembly is in the opened position, the fluid openings can be configured to flow the fluid in a laminar flow to the fluid exits of the suction valve to push the suction valve away from the suction face and create the venturi effect with the fluid.

In one or more embodiments, the method can include using a motorized pump with the plunger to pump high pressure fluid. The fluid can be pumped at a pressure up to about 50,000 psi.

The method can include opening the valve separating the fluid source from the pump using the plunger. The valve can be a ball valve.

The method can include flowing the fluid from the fluid source to the inlet of the pump. For example, the fluid can be gravity fed into the inlet.

The method can include using the pump to move the plunger away from the suction face and open the suction valve to create a vacuum and draw the fluid into fluid openings of the seat assembly.

The method can include flowing the fluid from the fluid openings through perforations of the valve stop that is installed around the suction valve using the plunger.

In operation, when the suction valve is opened the biasing means of the discharge valve can be expanded and the discharge valve can be closed. When the plunger moves away from the suction face and opens the suction valves, the plunger can also allow the biasing means of the discharge valve to close the discharge valve; thereby allowing the fluid in the discharge valve stop to flow through the plurality of holes in the discharge valve stop.

The method can include flowing the fluid that is between the suction face and the plunger through the central bore by using the pump to move the plunger towards the suction face; thereby creating a high pressure flow of the fluid with a venturi effect.

When the plunger moves towards the suction face, the suction valve can close and the biasing means of the discharge valve can compress; thereby allowing the discharge valve to open. When the discharge valve is opened, the high pressure flow of the fluid can flow into the discharge valve stop, and when the plunger moves away from the suction face again the discharge valve can close. As the discharge valve closes, the discharge valve can force the fluid from the discharge valve stop through the plurality of holes in the discharge valve stop.

The method can include controlling cycles of opening and closing of the suction valve and discharge valve by rotation of the pump.

Turning now to the figures, FIG. 1 depicts a perspective view of the seat assembly.

The seat assembly 9 can have a central bore 12.

The seat assembly 9 can have one or more fluid openings 22a and 22b, which can be tapered and in fluid communication with the central bore 12.

Figure 2B:
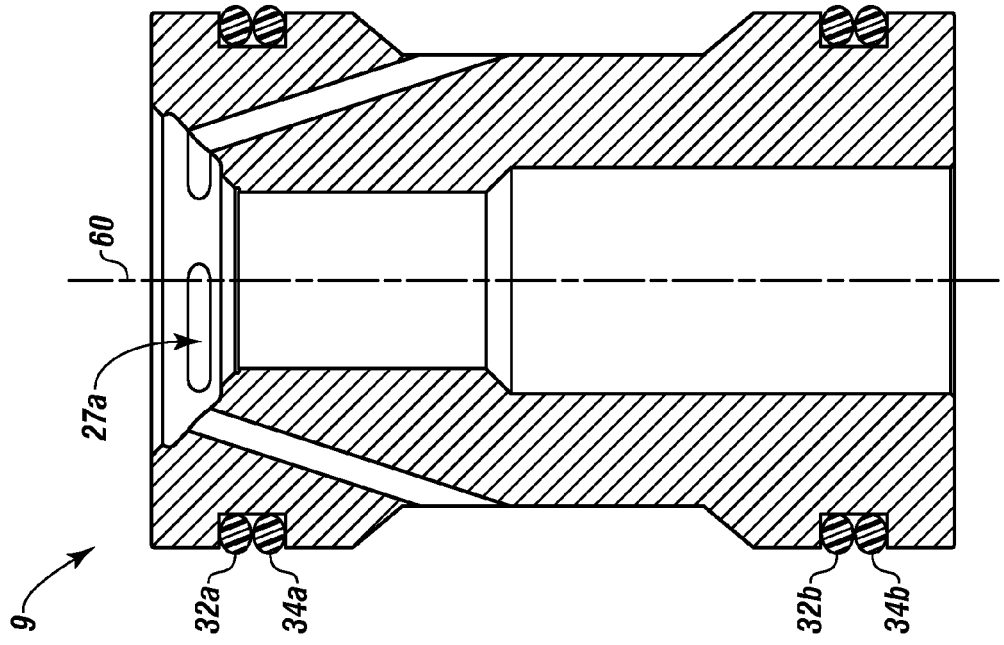
FIGS. 2A and 2B depict cut side views of the seat assembly.
Figure 2A:
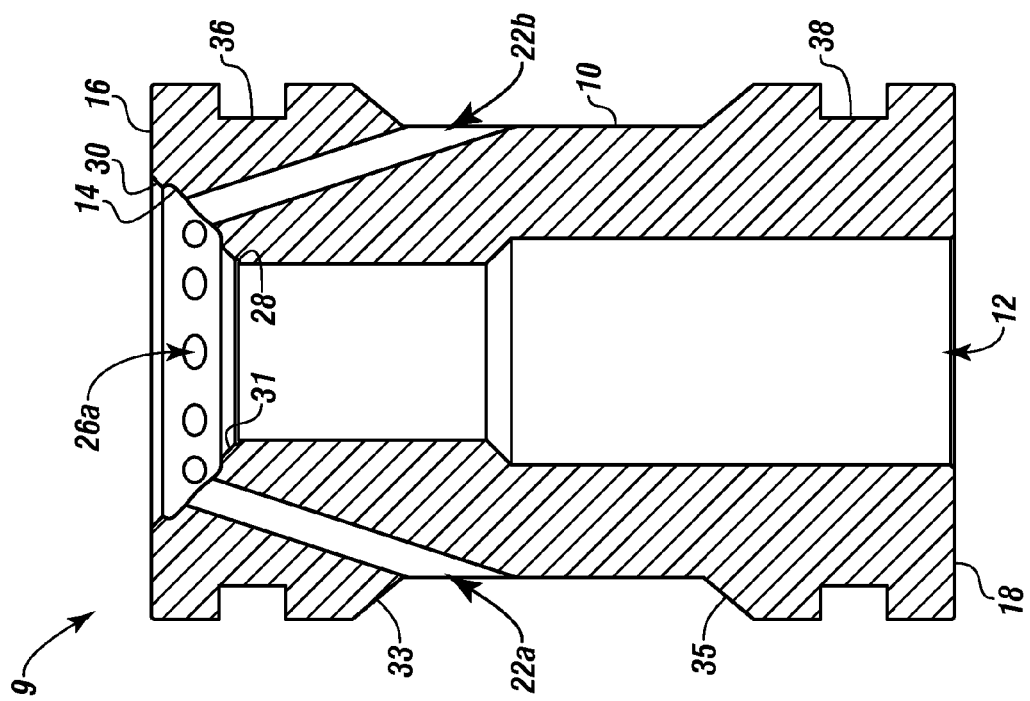

FIGS. 2A and 2B depict cut side views of the seat assembly.

The seat assembly 9 can have a longitudinal axis 60. The central bore 12 can be axially aligned with the longitudinal axis 60.

The seat assembly 9 can have a body 10 with a suction face 16 at one end, and a discharge face 18 at the opposite end. The suction face 16 and discharge face 18 can both be planar faces.

In one or more embodiments, the body 10 can have a diameter of about 0.75 inches, and the suction face 16 and discharge face 18 can both have diameters of about 1.5 inches. The body 10, suction face 16, and discharge face 18 can be made of 17-4 stainless steel that can be heat treated to a temperature of about 1,100 degrees Fahrenheit.

In one or more embodiments, the central bore 12 can have a diameter of about 0.625 inches proximate the suction face 16, and a diameter of about 0.5 inches proximate the discharge face 18. The central bore 12 can have a length of about 2.25 inches.

The seat assembly 9 can have a first seal ring 32, which can be formed on an outer surface of the body 10 between the suction face 16 and the discharge face 18. The first seal ring 32 can be positioned proximate to the suction face 16.

A first seal ring groove 36 can be formed between the suction face 16 and the first seal ring 32.

The first seal ring 32 can have a first angled shoulder 33, which can taper from the first seal ring 32 towards the outer surface of the body 10. In one or more embodiments, the first angled shoulder 33 can taper at an angle of about 45 degrees.

The seat assembly 9 can have a second seal ring 34, which can be formed on the outer surface of the body 10 between the discharge face 18 and the first seal ring 32. The second seal ring 34 can be positioned proximate to the discharge face 18.

A second seal ring groove 38 can be formed between the discharge face 18 and the second seal ring 34. The depth of the first seal ring groove 36 and the second seal ring groove 38 can be about 1.280 inches. The width of the first seal ring groove 36 and the second seal ring groove 38 can be about 0.210 inches.

The second seal ring 34 can have a second angled shoulder 35, which can taper from the second seal ring 32 towards the outer surface of the body 10. In one or more embodiments, the second angled shoulder 35 can taper at an angle of about 45 degrees.

In one or more embodiments, the first seal ring 32 and second seal ring 34 can extend from the body 10 to the same extent, such that the first seal ring 32 and second seal ring 34 can have the same diameter as the suction face 16 and discharge face 18.

In one or more embodiments, the diameters of the first seal ring 32, second seal ring 34, suction face 16, and discharge face 18 can each be at least 10 percent larger than a diameter of the body 10.

The seat assembly 9 can have one or more fluid openings 22a and 22b disposed about a circumference of the body 10, and formed into the outer surface of the body 10.

The fluid openings 22a and 22b can be in fluid communication with the central bore 12 when the suction valve and seat assembly is in the opened position.

The fluid openings 22a and 22b can be disposed between the first seal ring 32 and the second seal ring 34.

One or more embodiments of the seat assembly 9 can include four fluid openings, which can be tapered and disposed equidistantly around the body 10 adjacent the first angled shoulder 33.

The fluid openings 22a and 22b can taper into the body 10 and towards the suction face 16. Tapering of the fluid openings 22a and 22b can reduce turbulence of fluid flowing into the fluid openings 22a and 22b; thereby allowing the fluid to quickly flow into the fluid openings 22a and 22b.

Reduced turbulence of the fluid flowing through the fluid openings 22a and 22b can produce less pulsation in fluid streams created using the seat assembly 9. With reduced pulsation, less stress can be imparted to the associated high pressure fluid pump; thereby resulting in higher reliability, less breakage of pump nozzles and associated parts, an even flow of fluid, and a higher operational efficiency of the associated high pressure fluid pump.

The fluid can flow through the fluid openings 22a and 22b to exit one or more fluid exits 26a and 27a. Fluid exit 26a is a circular fluid exit, and fluid exit 27a is a cylindrical fluid exit.

The first seal ring groove 36 and the second seal ring groove 38 can contain one or more seals 13a, 13b, 13c, and 13d.

In one or more embodiments, both of the seals 13a and 13b can be elastomeric O-rings, which can be easily replaced in the field without requiring machining.

In one or more embodiments, one of the seals 13a and 13b can be an elastomeric O-ring and another of the seals 13a and 13b can be a polyether ether ketone seal. Also, one of the seals 13c and 13d can be an elastomeric O-ring and another of the seals 13c and 13d can be a polyether ether ketone seal.

The combination of an O-ring and a polyether ether ketone seal can provide increased longevity. For example, the combination of an O-ring and a polyether ether ketone seal can last up to five times longer than the combination of two O-rings.

The combination of an O-ring and a polyether ether ketone seal can allow the suction valve and seat assembly to sustain higher pressures than the combination of two O-rings. For example, the combination of an O-ring and a polyether ether ketone seal can sustain pressures up to 30 percent greater than are sustainable with the combination of two O-rings, such as pressures up to 30,000 psi.

The suction valve and seat assembly can be used with high pressure fluid pumps to pump fluid at pressures ranging from about 10,000 psi to about 40,000 psi without deforming for several years of continued use.

One or more embodiments of the suction valve and seat assembly can be used on high pressure fluid pumps having a horsepower ranging from about 30 hp to about 500 hp without requiring a change in configuration of the high pressure fluid pump, and without causing cavitations.

The seat assembly 9 can have an outer tapered valve seat 30, which can taper from the suction face 16 towards the central bore 12.

The seat assembly 9 can have a tapered portion 14 connected to the outer tapered valve seat 30. The tapered portion 14 can taper from the outer tapered valve seat 30 towards the central bore 12. Both the tapered portion 14 and the outer tapered valve seat 30 can be tapered at the same angle to the longitudinal axis 60 of the central bore 12.

The seat assembly 9 can have an inner tapered valve seat 31 connected to the tapered portion 14. The inner tapered valve seat 31 can taper from the tapered portion 14 towards the central bore 12. The tapering of the inner tapered valve seat 31 can be about 45 degrees from the longitudinal axis 60 of the central bore 12.

The seat assembly 9 can have a chamfer 28 connected to the inner tapered valve seat 31, and disposed between the inner tapered valve seat 31 and the central bore 12. The chamfer 28 can relieve pressure on the suction valve and prevent sticking of the suction valve onto the seat assembly 9.

Figure 3B:
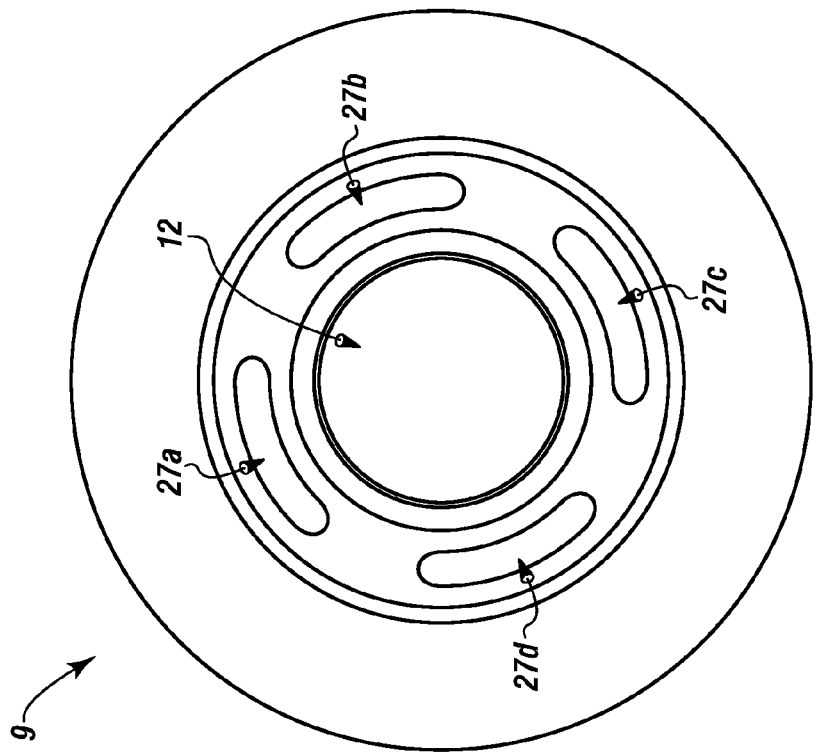
FIGS. 3A and 3B depict top views of the seat assembly.
Figure 3A:
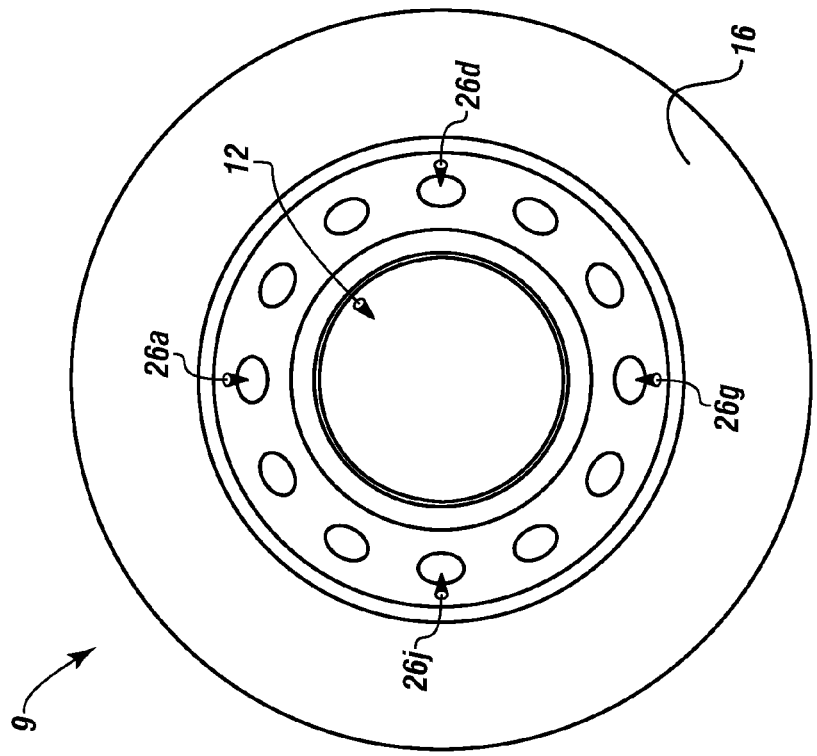

FIGS. 3A and 3B depict top views of the seat assembly.

The suction face 16 can be disposed about the central bore 12.

The seat assembly 9 can have the one or more fluid exits, such as fluid exits 26a, 26d, 26g, and 26j or fluid exits 27a, 27b, 27c, and 27d, which can be disposed through the tapered portion.

The fluid exits 26a, 26d, 26g, and 26j, and the fluid exits 27a, 27b, 27c, and 27d can be slots with an elliptical, circular, cylindrical, curvilinear, or other shape.

The fluid exits 26a, 26d, 26g, and 26j, and the fluid exits 27a, 27b, 27c, and 27d can be in fluid communication with the fluid openings for receiving fluid therefrom and flowing the fluid from the seat assembly 9.

The fluid exits 26a, 26d, 26g, and 26j, and the fluid exits 27a, 27b, 27c, and 27d can each have a width of about 0.100 inches, and a length of about 0.375 inches.

In one or more embodiments, a distance from each fluid exit 26a, 26d, 26g, and 26j, to one of the fluid openings can be about 0.700 inches, and a distance from each fluid exit 27a, 27b, 27c, and 27d to one of the fluid openings can be about 0.700 inches.

FIGS. 4A and 4B depict cut side views of the suction valve.

The suction valve 40 can be made of 17-4 stainless steel that can be heat treated to a temperature of about 1,150 degrees Fahrenheit.

One or more embodiments of the suction valve 40 can have a guide 42 and a first seat surface 44 connected to or formed as a one-piece structure with the guide 42.

The suction valve 40 can have a tapered surface 46 connected to or formed as a one-piece structure with the first seat surface 44.

The suction valve 40 can have a second seat surface 48 connected to or formed as a one-piece structure with the tapered surface 46.

The suction valve 40 can have an inner spring stop 56 extending from the second seat surface 48 opposite the tapered surface 46.

In one or more embodiments the tapered surface 46 can be connected to or formed as a one-piece structure with the guide 42 and the inner spring stop 56.

The suction valve 40 can include a spring guide 52 opposite the guide 42. In one or more embodiments, the spring guide 52 can have an outer diameter at least five percent smaller than the outer diameter of the suction valve 40. For example, the diameter of the suction valve 40 can be about 1 inch, the outer diameter of the spring guide 52 can be about 0.870 inches, and the outer diameter of the guide 42 can be about 0.497 inches.

A valve bore 43 can extend from one end of the suction valve 40 to another end of the suction valve 40. The valve bore 43 can extend through the guide 42, the tapered surface 46, and the spring guide 52.

In one or more embodiments, the inner diameter of the valve bore 43 can range from about 0.375 inches to about 0.640 inches, and the length of the suction valve 40 can be about 1.30 inches.

The suction valve 40 can have an inner spring stop 56 disposed between the valve bore 43 and the spring guide 52. The inner spring stop 56 can have a diameter that is greater than the inner and/or outer diameter of the valve bore 43.

The spring guide 52 can extend upwards from the outer spring stop 50. In operation, the spring guide 52 can contain an inner spring and support an outer spring. The inner and outer springs can be coiled springs. The inner spring stop 56 can prevent the inner spring from compressing into the valve bore 43.

The spring guide 52 can have a height from the inner spring stop 56 of about 0.300 inches.

Figure 5A:
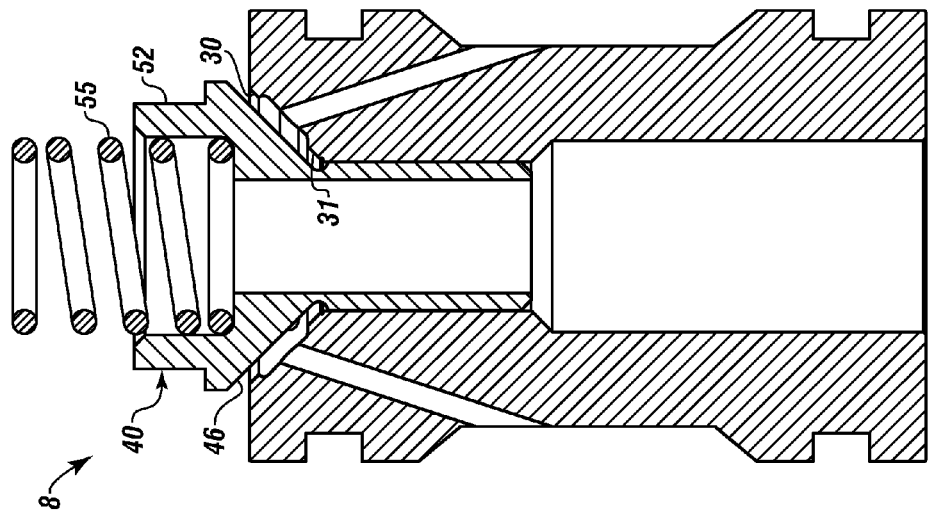
FIGS. 5A and 5B depict a suction valve and seat assembly in a closed position and an opened position.
Figure 5B:
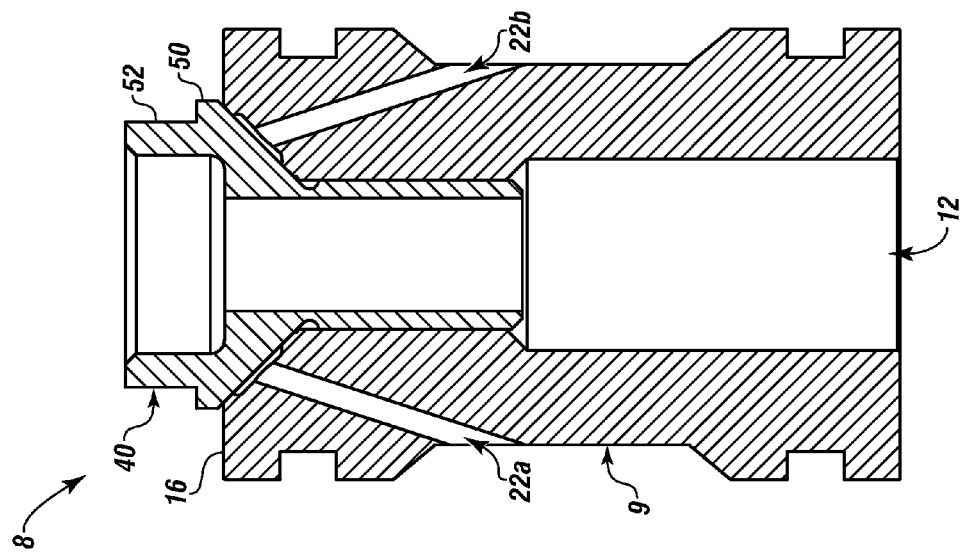

FIG. 5A depicts an assembled view of the suction valve and seat assembly 8 in a closed position and FIG. 5B depicts an assembled view of the suction valve and seat assembly 8 in an opened position.

A spring 55 can be disposed within the spring guide 52.

In the closed position, the suction valve 40 can be engaged within the central bore 12 of the seat assembly 9, such that a bottom surface of the outer spring stop 50 is engaged with a top surface of the suction face 16, and such that the inner tapered valve seat 31 and outer tapered valve seat 30 are engaged with the tapered surface 46.

The suction valve and seat assembly 8 can be moved into the opened position by flowing fluid through the fluid openings 22*a* and 22*b* of the seat assembly 9. The fluid can exit into the central bore 12 of the seat assembly 9 proximate the suction valve 40 through the fluid exits. The fluid can be water, glycol, methanol, diesel fuel, or another fluid.

The exiting fluid can engage with the suction valve 40 to push the suction valve 40 away from the suction face 16, such that the bottom surface of the outer spring stop 50 is no longer engaged with the top surface of the suction face 16, and such that the inner tapered valve seat 31 and outer tapered valve seat 30 are no longer engaged with the tapered surface 46.

Also, at least a portion of the suction valve 40 that was disposed within the central bore 12 in the closed position can be disposed outside of the central bore 12 in the opened position.

Figure 6:
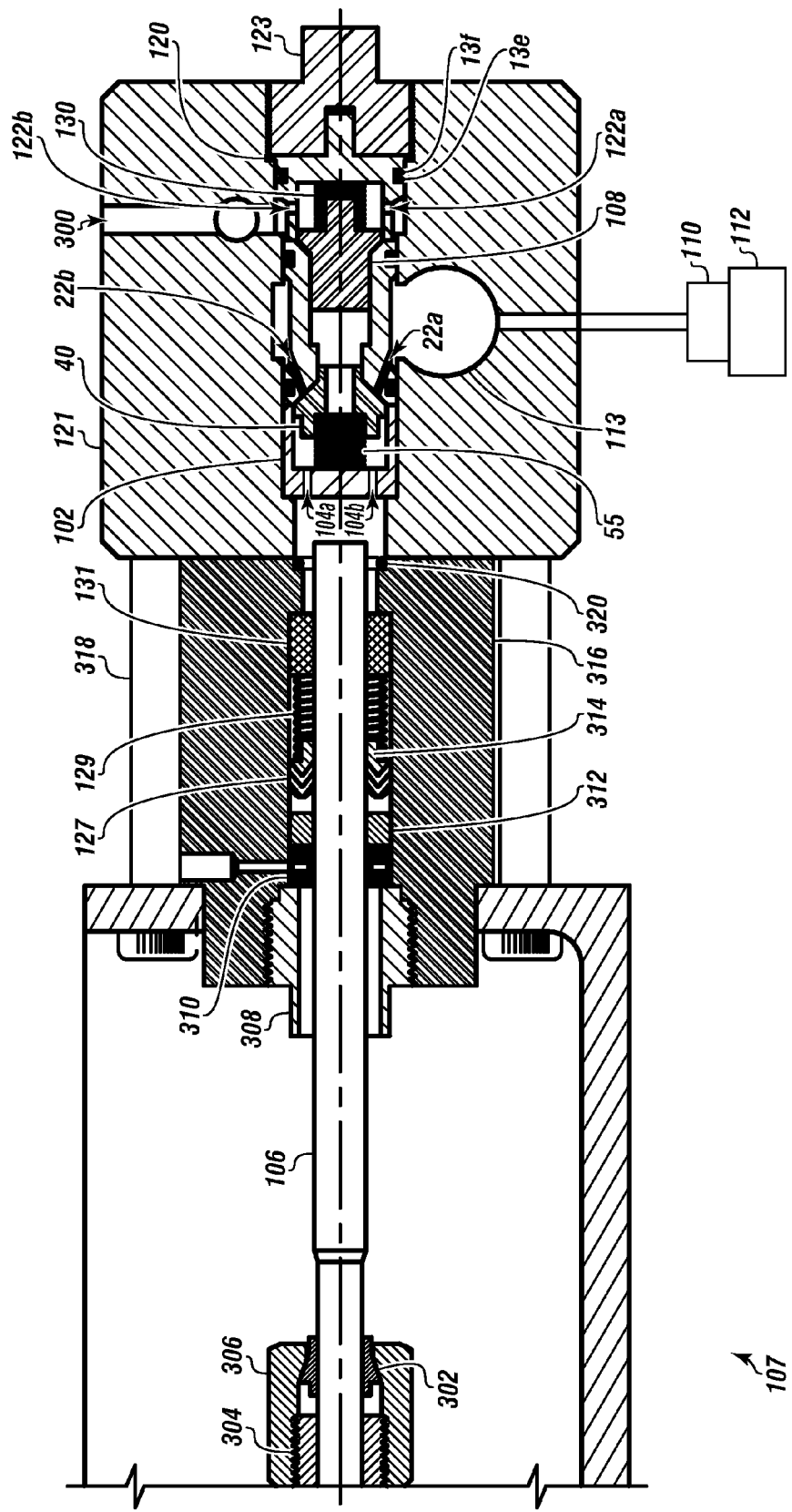
FIG. 6 depicts an embodiment of the suction valve and seat assembly installed in a pump.

FIG. 6 depicts an embodiment of a pump and plunger connected with the suction valve and seat assembly.

The pump 107 can have a plunger 106 for pumping fluid. In one or more embodiments, the plunger 106 can be a solid rod that provides a desired fluid flow, which can be determined by a plunger diameter multiplied by a number of plunges, a number of strokes of the pump 107, and revolutions per minute of a motor rotating the plunger 106. The motor can have a horsepower ranging from about 100 to about 500.

At one end, the plunger 106 can engage through a collet bushing 302 and plunger adapter 304, which can be within a collet nut 306. At an opposite end, the plunger 106 can engage through a gland nut 308, a lantern ring 310, and a rear bushing 312.

A valve 110 can separate a fluid source 112 from the pump 107. The valve 110 can be opened using the plunger 106.

The plunger 106 can include a packing 127, front packing ring 314, packing spring 129, and throat bushing 131 within a stuffing box 316 and fluid cylinder bolts 318. The stuffing box 316 can have stuffing box seals 320.

With the valve 110 opened, the fluid can flow from the fluid source 112 into an inlet 113 of the pump 107.

The suction valve 40 and discharge valve 108 can be installed within a fluid cylinder 121 of the pump 107. A discharge plug 123 can retain the seat assembly with the suction valve 40 and discharge valve 108 within the pump 107.

The pump 107 can move the plunger 106 away from a suction face of the seat assembly proximate the suction valve 40 to compress a suction valve biasing means, such as the spring 55, and open the suction valve 40 to create a vacuum and draw the fluid into fluid openings 22*a* and 22*b*.

The fluid can flow from the fluid openings 22*a* and 22*b* through perforations 104*a* and 104*b* of a valve stop 102 that is installed around the suction valve 40 via movement of the plunger 106.

In one or more embodiments, the number of perforations 104*a* and 104*b* in the valve stop 102 can range from about six to about twelve, and a diameter of the perforations 104*a* and 104*b* can range from about $\frac{1}{16}$ of an inch to about $\frac{5}{16}$ of an inch.

When the suction valve 40 is opened, a biasing means 130 of the discharge valve 108 can be expanded and the discharge valve 108 can be closed.

The plunger 106 can move away from the suction face of the seat assembly to open the suction valve 40 and the allow the biasing means 130 to close the discharge valve 108; thereby allowing the fluid in a discharge valve stop 120 installed around the discharge valve 108 to flow through a plurality of holes 122*a* and 122*b* in the discharge valve stop 120 to an exit 300.

In one or more embodiments, the discharge valve stop 120 can have seals 13*e* and 13*f*, which can be elastomeric, O-rings, polyether ether ketone seals, or combinations thereof.

The fluid between the suction face of the seat assembly and the plunger 106 can flow through the central bore of the seat assembly by movement of the plunger 106 towards the suction face, which can create a high-pressure flow of the fluid with a venturi effect.

When the plunger 106 moves towards the suction face of the seat assembly the suction valve 40 can close and the biasing means 130 of the discharge valve 108 can compress; thereby allowing the discharge valve 108 to open.

When the discharge valve 108 is opened, the high-pressure flow of the fluid can flow into the discharge valve stop 120.

When the plunger 106 moves away from the suction face of the seat assembly again, the discharge valve 108 can close, and as the discharge valve 108 closes, the discharge valve 108 can force the fluid from the discharge valve stop 120 through the plurality of holes 122*a* and 122*b* to the exit 300. The plurality of holes 122*a* and 122*b* in the discharge valve stop 120 can range from about six to about twelve, and a diameter of the plurality of holes 122*a* and 122*b* can range from about $\frac{1}{16}$ of an inch to about $\frac{5}{16}$ of an inch.

In operation, cycles of opening and closing of the suction valve 40 and the discharge valve 108 can be controlled by rotation of the pump 107 and movement of the plunger 106.

In one or more embodiments, the fluid can be water, diesel fuel, methanol, ethanol, glycol, or a hydraulic fluid.

While these embodiments have been described with emphasis on the embodiments, it should be understood that within the scope of the appended claims, the embodiments might be practiced other than as specifically described herein.

What is claimed is:

1. A suction valve and seat assembly for engaging a fluid side of a high pressure water pump, wherein the suction valve and seat assembly comprises:

a. a seat assembly comprising:
      (i) a body with a central bore disposed along a longitudinal axis of the body, wherein the body has a tapered portion proximate one end of the central bore, the tapered portion comprising a plurality of fluid exits disposed through the tapered portion, each fluid exit of the plurality of fluid exits having an elliptical shape to provide a laminar flow from the central bore, each fluid exit of the plurality of fluid exits having a length ranging from 0.025 inches to 2 inches and a width ranging from 0.2 inches to 1 inch;
      (ii) a suction face on an end of the body, wherein a diameter of the suction face is larger than an outer diameter of the body;
      (iii) a discharge face on an end of the body opposite the suction face, wherein the discharge face is in fluid communication with the central bore;

(iv) from two fluid openings to six fluid openings penetrating through an outer surface of the body, wherein each fluid opening is configured to flow fluid into the seat assembly to the plurality of fluid exits on the tapered portion, wherein the from two fluid openings to six fluid openings each have a slope ranging from fifteen degrees to twenty-five degrees from the longitudinal axis;
(v) a chamfer disposed between the central bore and the tapered portion;
(vi) an outer tapered valve seat disposed between the suction face and the tapered portion, wherein the outer tapered valve seat has a first diameter, and wherein the tapered portion does not engage a tapered surface;
(vii) an inner tapered valve seat disposed between the tapered portion and the chamfer, wherein the inner tapered valve seat has a second diameter, and wherein the first diameter is larger than the second diameter;
(viii) a first seal ring groove integral with the outer surface of the body, wherein the first seal ring groove is formed between a first seal ring and the suction face, and wherein a first angled shoulder is formed between the suction face and the discharge face; and
(ix) a second seal ring groove integral with the outer surface of the body and spaced apart from the first seal ring, wherein the second seal ring groove is formed between a second seal ring and the discharge face, and wherein a second angled shoulder is formed between the suction face and the discharge face; and
b. a suction valve comprising:
(i) a guide with a valve bore configured to slidingly engage within the central bore;
(ii) a first seat surface adjacent the guide;
(iii) the tapered surface adjacent the first seat surface;
(iv) a second seat surface adjacent the tapered surface;
(v) an inner spring stop; and
(vi) a spring guide containing the inner spring stop, wherein the inner spring stop has a diameter greater than an inner diameter of the valve bore, wherein the spring guide is configured to contain a spring, and wherein:
1. when the suction valve and seat assembly is in a closed position: the first seat surface and the second seat surface are engaged with the outer tapered valve seat and the inner tapered valve seat, allowing the valve bore to be in fluid communication with the central bore, wherein the suction valve and seat assembly is configured to allow fluid to flow through the valve bore and the central bore; and
2. when the suction valve and seat assembly is in an opened position: the fluid openings are configured to flow the fluid in the laminar flow to the plurality of fluid exits to push the suction valve away from the suction face and create a venturi effect with the fluid.

2. The suction valve and seat assembly of claim 1, wherein each of the fluid openings is a tapered fluid opening, a square fluid opening, or combinations thereof.

3. The suction valve and seat assembly of claim 1, wherein the first seal ring is disposed between the fluid openings and the suction face, and wherein the second seal ring is disposed between the fluid openings and the discharge face.

4. The suction valve and seat assembly of claim 1, wherein the body comprises four fluid openings and four fluid exits.

5. The suction valve and seat assembly of claim 1, wherein the fluid openings each have a length ranging from 0.2 inches to 1 inch and a width ranging from 0.2 inches to 0.538 inches.

6. The suction valve and seat assembly of claim 1, wherein an inner diameter of the central bore ranges from 0.25 inches to 2 inches.

7. The suction valve and seat assembly of claim 1, wherein an inner diameter of the valve bore ranges from 0.25 inches to 2.5 inches and is smaller than the inner diameter of the central bore to allow for a sliding fit between the guide and the central bore.

8. The suction valve and seat assembly of claim 1, wherein the seat assembly has a length ranging from 1 inch to 4 inches and a diameter ranging from 0.75 inches to 3.25 inches.

9. The suction valve and seat assembly of claim 1, further comprising:
a. a first elastomeric O-ring disposed within the first seal ring groove, and a second elastomeric O-ring disposed within the second seal ring groove; or
b. two elastomeric O-rings disposed within the first seal ring groove, and two elastomeric O-rings disposed within the second seal ring groove; or
c. a first elastomeric O-ring and a first polyether ether ketone seal simultaneously disposed within the first seal ring groove, and a second elastomeric O-ring and a second polyether ether ketone seal simultaneously disposed within the second seal ring groove.

10. The suction valve and seat assembly of claim 1, wherein the tapered portion has a slope ranging from 30 degrees to 50 degrees from the longitudinal axis.

11. The suction valve and seat assembly of claim 10, wherein the tapered surface is at a slope identical to the tapered portion.

12. A suction valve and seat assembly for engaging a fluid side of high pressure water pumps, wherein the suction valve and seat assembly comprises:
a. a seat assembly comprising:
(i) a body with a central bore;
(ii) a suction face on an end of the body;
(iii) a discharge face on an end of the body opposite the suction face, wherein the discharge face is in fluid communication with the central bore;
(iv) fluid openings disposed through an outer surface of the body, wherein the fluid openings are configured to flow fluid into the seat assembly to a plurality of fluid exits, wherein the fluid openings each have a slope ranging from fifteen degrees to twenty-five degrees from the longitudinal axis;
(v) a tapered portion disposed between the suction face and the central bore, the tapered portion comprising the plurality of fluid exits, each fluid exit of the plurality of fluid exits having an elliptical shape to provide a laminar flow from the central bore, each fluid exit of the plurality of fluid exits having a length ranging from 0.025 inches to 2 inches and a width ranging from 0.2 inches to 1 inch;
(vi) the plurality of fluid exits disposed through the tapered portion and in fluid communication with the fluid openings, wherein each fluid opening is configured to flow fluid into the seat assembly to at least one of the fluid exits;
(vii) an outer tapered valve seat disposed between the suction face and the tapered portion, and wherein the tapered portion does not engage a tapered surface;
(viii) a chamfer disposed between the central bore and the tapered portion;
(ix) an inner tapered valve seat disposed between the tapered portion and the chamfer;
(x) a first seal ring groove on the outer surface of the body, wherein the first seal ring groove is formed between a first seal ring and the suction face, and wherein the first seal ring is disposed between the suction face and the fluid openings; and (xi) a second seal ring groove on the outer surface of the body, wherein the second seal ring groove is formed between a second seal ring and the discharge face, and wherein the second seal ring is disposed between the discharge face and the fluid openings; and b. a suction valve comprising:
   (i) a guide with a valve bore, wherein the guide is configured to engage within the central bore;
   (ii) the tapered surface adjacent the guide;
   (iii) an inner spring stop adjacent the tapered surface; and
   (iv) a spring guide adjacent the inner spring stop, wherein the inner spring stop has a diameter greater than an inner diameter of the valve bore, wherein the spring guide is configured to contain a spring, and wherein:
      1. when the suction valve and seat assembly is in a closed position: the tapered surface is engaged with the inner tapered valve seat and the outer tapered valve seat allowing the valve bore to be in fluid communication with the central bore, wherein the suction valve and seal assembly is configured to allow fluid to flow through the valve bore and the central bore; and
      2. when the suction valve and seat assembly is in an opened position: the fluid openings are configured to receive the fluid and flow the fluid in the laminar flow to the plurality of fluid exits to push the suction valve away from the suction face and create a venturi effect with the fluid.

13. The suction valve and seat assembly of claim 12, wherein each of the fluid openings is a tapered fluid opening, a square fluid opening, or combinations thereof.

14. The suction valve and seat assembly of claim 12, wherein the plurality of fluid exits are elliptical or circular in shape.

15. The suction valve and seat assembly of claim 12, wherein the tapered surface is at a slope identical to the tapered portion of the seat assembly.

16. The suction valve and seat assembly of claim 12, further comprising:
   a. a first elastomeric O-ring disposed within the first seal ring groove, and a second elastomeric O-ring disposed within the second seal ring groove; or
   b. two elastomeric O-rings disposed within the first seal ring groove, and two elastomeric O-rings disposed within the second seal ring groove; or
   c. a first elastomeric O-ring and a first polyether ether ketone seal simultaneously disposed within the first seal ring groove, and a second elastomeric O-ring and a second polyether ether ketone seal simultaneously disposed within the second seal ring groove.

* * * * *